No. 731,751. PATENTED JUNE 23, 1903.
W. S. BURGESS.
ALIDADE OR INDICATOR FOR SHIPS' COMPASSES.
APPLICATION FILED JULY 12, 1902.
NO MODEL. 2 SHEETS—SHEET 2.
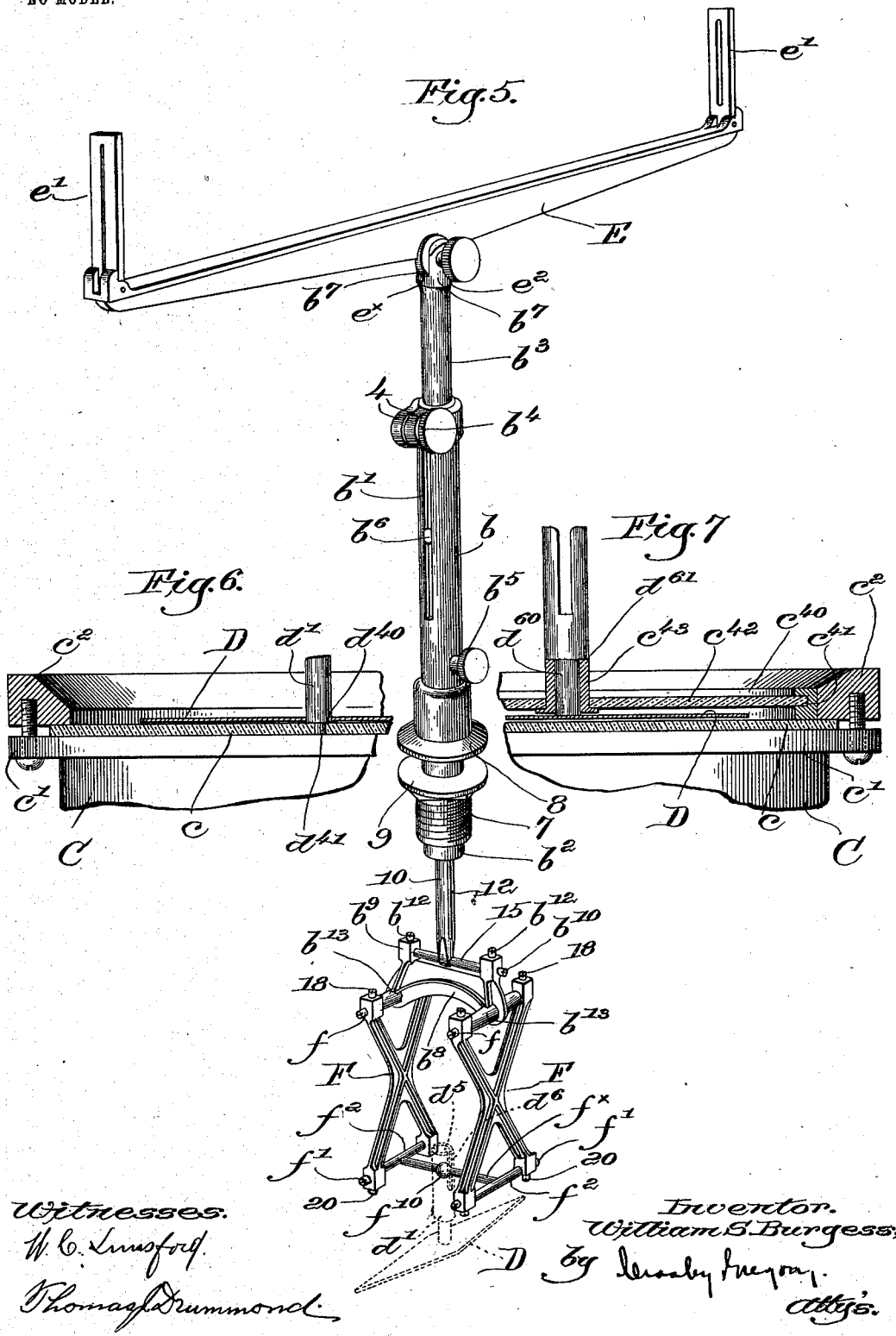

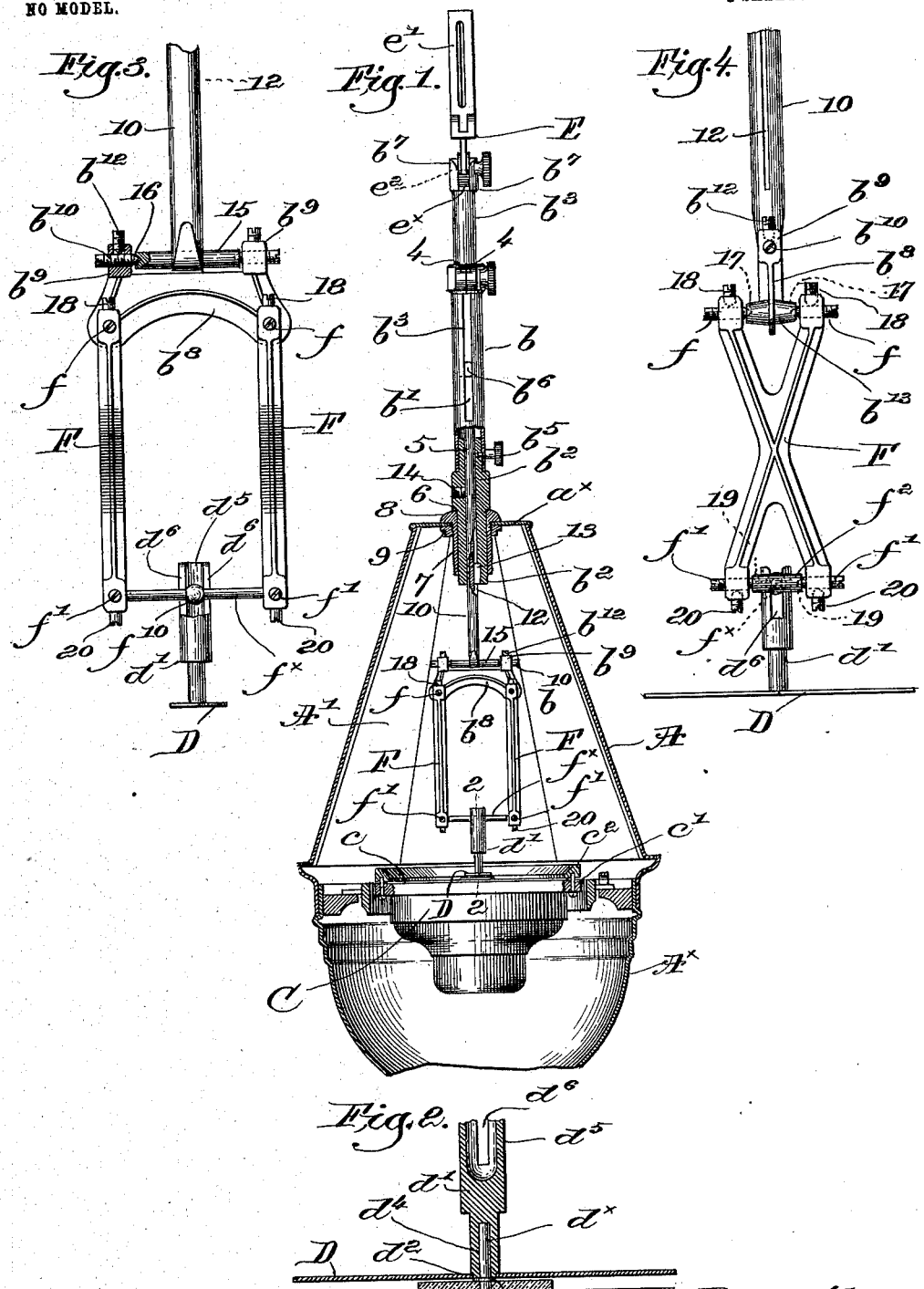

No. 731,751.

Patented June 23, 1903.

UNITED STATES PATENT OFFICE.

WILLIAM S. BURGESS, OF BOSTON, MASSACHUSETTS.

ALIDADE OR INDICATOR FOR SHIPS' COMPASSES.

SPECIFICATION forming part of Letters Patent No. 731,751, dated June 23, 1903.

Application filed July 12, 1902. Serial No. 115,306. (No model.)

*To all whom it may concern:*

Be it known that I, WILLIAM S. BURGESS, a citizen of the United States, and a resident of Boston, county of Suffolk, and State of Massachusetts, have invented an Improvement in Alidades or Indicators for Ships' Compasses, of which the following description, in connection with the accompanying drawings, is a specification, like letters and numerals on the drawings representing like parts.

This invention has for its object the production of a highly efficient and accurate alidade or indicator of novel construction for the compasses of sea-going vessels, whereby at all times the bearings of an object distant from the vessel may be readily taken and simultaneously and with great accuracy indicated on the face of the compass-dial.

In my present invention the sighting device is rotatably mounted on the binnacle, while the alidade or indicating-pointer is carried wholly by the compass and is angularly movable adjacent the dial thereof, and inasmuch as the compass is maintained substantially level at all times, while the binnacle partakes of the motion of the vessel, a connection between the sighting device and alidade is provided which maintains them always in the same radial plane and angularly movable in unison, while permitting a relative tipping movement of the sighting device and alidade in such plane.

The various novel features of my invention will be hereinafter described, and particularly pointed out in the following claims.

Figure 1 shows in vertical section a ship's binnacle with its pedestal or stand broken off, the compass being shown in elevation with one embodiment of my invention applied thereto. Fig. 2 is an enlarged sectional detail on the line 2 2, Fig. 1, showing the manner in which the alidade is supported and a portion of the universal joint between it and the shaft on which the sighting device is mounted. Fig. 3 is an enlarged detail, in front elevation and partly broken out, of the connecting member between the alidade and the shaft on which the sighting device is mounted, the alidade being also shown with a portion of the joint attached thereto broken out. Fig. 4 is a side elevation, enlarged, of the parts shown in Fig. 3. Fig. 5 is an enlarged perspective view of the indicating device as a whole detached from binnacle and compass, and Figs. 6 and 7 are sectional details of modified means for supporting the alidade on the compass to be described.

As will appear more fully hereinafter, my novel alidade or indicating device can be readily applied to existing binnacles and their compasses in a thoroughly efficient manner, or it may be applied during the construction of the binnacle.

Referring to Fig. 1, the binnacle frame or case A, of any desirable or ordinary construction, is provided with windows A' for the admission of light and observation of the compass C, suspended in usual manner in the bowl-like base $A^\times$ of the binnacle, so that its dial is horizontal and the attached magnetic needle always points to the north, the usual dial being protected by a glass plate $c$, held in place on the annular flange $c'$ by a ring $c^2$.

The indicator, pointer, or needle D, hereinafter called the "alidade" and best shown in Figs. 3, 4, and 5, is rotatably mounted on the compass and movable adjacent the dial thereof just above the plate $c$, and in Figs. 1 and 2 I have shown one very efficient means for supporting the alidade. A small disk $d$, preferably of glass, has a central upright metal pin or stud $d^\times$ secured firmly to it, and the disk is cemented to the upper surface of the glass plate $c$ of the compass, the stud $d^\times$ being located at the center of the plate directly over the center of the compass-dial. The pin or stud $d^\times$ projects some little distance above the plate $c$ and forms a bearing upon which the alidade D is rotatably mounted, and referring to Fig. 2 the alidade has rigidly secured to it an upright post $d'$ at right angles to it and in alinement with the center of the alidade, the latter having a central hole $d^2$ to receive the reduced end $d^3$ of the post, the latter having a longitudinal hole $d^4$ therein to receive the bearing-pin or stud $d^\times$. The upper end of the post is enlarged in diameter and provided with a longitudinal bore $d^5$, and the bored part of the post is longitudinally slotted from its upper end down to the bottom of the bore at $d^6$, Figs. 2, 3, 4, and 5. The slots $d^6$ are diametrically opposite each other, and such diameter is at right angles to the length of the alidade D, the post constructed as described constituting one part or member of a universal-joint connection between the alidade and the shaft upon which the sighting device is mounted.

The top $a^×$ of the binnacle is provided with a central hole to receive the lower end of an upright rotatable shaft, carrying at its upper end a suitable sighting device and at its lower end connected with the alidade by a universal-joint connection of peculiar and novel construction, to be described. The shaft comprises three sections, as herein shown—a tubular main section $b$, longitudinally slotted at $b'$, an upper tubular end section $b^3$, slidably mounted within it and held from rotation by a fin $b^6$ entering the slot $b'$, (see Figs. 1 and 5,) and a lower end section $b^2$. A clamp or set-screw $b^4$ in the opposite ears 4 at the upper end of the main section serves to maintain the section $b^3$ in longitudinally-adjusted position, and the sections $b'$ and $b^2$ are connected and also held from relative rotative movement by a suitable screw $b^5$, mounted in the former and adapted to enter a socket 5 in the latter. (See Fig. 1.) At its upper end the section $b^3$ is longitudinally slotted in the plane of the slot $b'$ to present parallel upturned ears $b^7$, between which enters a depending lug $e^×$, fast on the sighting device E, shown as a bar having alined hinged sights $e'$ at its ends, a clamp-screw $e^2$, passing through the ears $b^7$ and lug $e^×$, constituting a fulcrum on which the sighting device can be tipped when in use, said fulcrum being at right angles to the device E and also to the ears $b^7$.

Any suitable sighting device, such as a telescope, may be used instead of the sighting-bar shown, the particular structure thereof being immaterial so far as my present invention is concerned.

By loosening the set-screw $b^4$ the shaft-section $b^3$ can be raised or lowered, as desired, in the section $b$ to thereby bring the sighting device to a level convenient for use by the observer and then clamped, while the plane in which the device E can tip will always intersect the longitudinal axis of the sectional shaft and maintain a fixed radial position relative thereto.

The section $b^2$ is reduced in diameter at its lower portion to form a shoulder 6, and the reduced portion has mounted upon it an externally-threaded sleeve 7, having an enlarged flat circular flange or head 8, adapted to rest upon the binnacle-top $a^×$, said flange abutting against the shoulder 6, and thereby vertically supporting the sectional shaft, the sleeve passing down through the hole in the binnacle-top and being rigidly clamped thereto by a nut 9 on the threaded portion of the sleeve, as shown clearly in Fig. 1, the foot of the shaft-section $b^2$ passing down through the sleeve into the binnacle. The nut 9 when set up bears against the under side of the binnacle-top, said nut and the sleeve retaining the sectional shaft in place on the binnacle and providing a long firm bearing in which it can rotate.

The end section $b^2$ is longitudinally bored to receive a rod-like extension 10, herein shown as having a longitudinal groove 12, entered by a feather 13 on the section $b^2$ to prevent rotation of the extension, longitudinal movement thereof being prevented by a suitable set-screw 14, Fig. 1.

By the longitudinal adjustment of the extension 10 I provide the apparatus for binnacles of different heights, the distance between the dial of the compass and the binnacle-top $a^×$ varying very considerably in different structures.

The lower end of the extension 10 has rigidly secured to it a cross-bar 15, parallel to the fulcrum $e^2$, on which the sighting device E rocks, the described connections between the several parts of the sectional shaft absolutely preventing their relative rotation, and consequently always maintaining the said fulcrum and cross-bar in the same plane and one which intersects the longitudinal axis of the shaft.

A downturned yoke $b^8$, having upturned ears $b^9$, is pivotally connected with the cross-bar by pointed pivot-screws $b^{10}$, (see Fig. 3,) extended through the ears and seating in concavities 16 in the opposite ends of the cross-bar, suitable set-screws $b^{12}$ holding the pivot-screws immovable in the ears, the pivot-screws providing for taking up wear. The yoke can thus rock or swing fore and aft relatively to the sighting device, but has no movement in a transverse direction relatively to the upright shaft, the downturned ends of the yoke being provided with parallel hubs $b^{13}$, Figs. 4 and 5, at right angles to the pivot-screws $b^{10}$, the opposite ends of the hubs having depressions 17 therein (see dotted lines, Fig. 4) for a purpose to be described.

An open extension member of peculiar construction, now to be described, completes the connection between the upright sectional shaft and the alidade, so constructed and arranged that whatever the rolling, pitching, or other movements of the vessel the alidade D will move angularly in unison with the sighting device when the latter is turned upon its upright support—viz., the sectional shaft—and in a plane intersecting the longitudinal axes of the alidade and sighting device, respectively. The extension member comprises, as herein shown, two like X-shaped upright sides F, provided at the upper and lower open or bifurcated ends thereof with pairs of opposite inturned pivot-screws $ff'$, respectively, the former being held in adjusted position by set-screws 18, and having their inner ends pointed to enter the depressions 17 in the opposite ends of the hubs $b^{13}$. One side F is thereby pivotally connected at its upper end with each hub, the sides being adapted to swing transversely to the sighting device.

The pair of pivot-screws $f'$ at the lower end of each side of the extension member are held in place by set-screws 20 and are also inturned and opposed, their inner ends being pointed to enter depressions 19, Fig. 4, in the opposite ends of short arms $f^2$, rigidly secured to the ends of a cross-bar $f^\times$ at right angles thereto, and consequently parallel to each other, the arms being so placed that the distance between the centers of the two pairs of pivot-screws $f'$ is exactly equal to that between the pivot-screws $f$. Consequently the sides F will always remain in parallelism, and the cross-bars 15 and $f^\times$ will also be maintained in parallelism under all circumstances. It is to be observed, however, that the cross-bar $f^\times$, which forms the foot of the extension member, can swing fore and aft relatively to the sighting device about the pivot-screws $b^{10}$ as fulcra, and it can also move longitudinally in a direction transverse to the sighting device, but always in parallelism with its fulcrum $e^2$. At its center the bar or foot $f^\times$ has a ball-like enlargement $f^{10}$, which fits freely in the bore $d^5$ of the upturned post $d'$ of the alidade, the upright slots $d^6$ receiving the bar at each side of the enlargement, as will be clearly understood from the drawings. The bar or foot $f^\times$ of the extension member may thus rise and fall in the slotted foot away from or toward the alidade and at right angles to the longitudinal axis of the alidade or pointer D, the connection between the latter and the extension member being practically a universal or ball-and-socket joint. So, too, any bodily rotative movement of the extension member, due to rotation of the upright sectional shaft when the sighting device is swung to take a sight, will be transmitted simultaneously and equally to the alidade by the coöperation of the bar $f^\times$ and the slotted post $d'$, the rod or extension 10 being so adjusted that under all conditions the connection at the part $f^{10}$ will be maintained.

By the construction described a universal-joint connection is thus interposed between and connects the lower end of the upright shaft and the alidade, the connection being self-adjusting for all movements of the binnacle relatively to the compass-dial, which remains substantially horizontal.

It will be manifest from the foregoing description that the longitudinal axes of the alidade and the sighting device will always be maintained in the same radial plane and compelled to move angularly in unison, no matter what may be the inclination of the upright shaft relative to the plane of the compass-dial, so that under all conditions of pitching, rolling, or vibrations of the vessel the universal and self-adjusting connection between sighting device and alidade will be preserved. While they are maintained in the same radial plane, it will be obvious that relative tipping of the sighting device and alidade in such plane is permitted by the connection between them, so that in taking bearings the sighting device can be tipped on its fulcrum $e^2$ as may be necessary or desirable.

The extension member by reason of its separated sides F and the distance between the yoke $d^8$ and the cross-bar $f^\times$ presents a sight-opening, through which a free and unobstructed view of the lubber-mark and alidade is afforded, and instead of making the sides F straight they may be bent or bowed outward, if desired, to increase the sight-opening.

The alidade being movable close to the compass-dial, the reading of a bearing observed by the aid of the sighting device is made very accurate.

In order to apply the apparatus to a binnacle and compass, it is only necessary to make the shaft-hole in the top of the former connect the bearing-sleeve 7 therewith and insert the lower end section $b^2$ of the shaft and fix therein the extension-rod 10, as described, and mount the alidade on the compass.

In Fig. 6 I have shown means for supporting the alidade, which is a modification of the means shown in Figs. 1, 2, and 5, the alidade D and the upper end of the post $d'$ being bored and slotted substantially as hereinbefore described; but the lower end of the post is extended and reduced in diameter to form an annular shoulder $d^{40}$, which rests on the top of the glass cover $c$ of the compass, and a pin $d^{41}$, which rotatably enters a hole in said cover. Thus the alidade is directly supported in a rotatable manner by the cover $c$.

Yet another modification of the alidade-supporting means is shown in Fig. 7, wherein I employ a split ring $c^{40}$, having an internal annular groove $c^{41}$ to receive the periphery of a circular plate $c^{42}$, of glass, the ring $c^{40}$ being set down into the holding-ring $c^2$, so that there is a space between the plate $c^{42}$ and the glass cover $c$. The plate $c^{42}$ has secured to it at its center an upturned sleeve $c^{43}$, preferably of metal, and the lower end of the post $d'$ is reduced in diameter and elongated, as at $d^{60}$, to enter the sleeve and project below it, the alidade being attached to the projecting end of the part $d^{60}$, so that it rotates between the glass plates $c$ and $c^{42}$. The annular shoulder $d^{61}$ on the post rests on the top of the sleeve $c^{43}$, and is thereby vertically sustained. In this construction the alidade is protected by the superposed plate $c^{42}$.

The connection between the alidade and the sighting device is that hereinbefore described whatever the mode of supporting the alidade on the compass, and whatever the manner of supporting the alidade there will be no obstruction to a clear view of its extremities.

I have herein shown and described one practical embodiment of my invention as a whole and several different forms of supporting means for the alidade, and my invention accordingly is not restricted to the precise construction and arrangement herein shown and described, as the same may be modified or changed in various particulars or details without departing from the spirit and scope of my invention.

Having fully described my invention, what I claim as new, and desire to secure by Letters Patent, is—

1. A binnacle, a compass therein, an alidade or indicator mounted on and positively connected with the compass and rotatable adjacent the dial thereof, an upright shaft rotatably mounted on and extended above the top of the binnacle and having a sighting device at its upper end, and a connection between said shaft and the alidade or indicator to maintain it and the sighting device in the same radial plane and permit relative tipping movement of the alidade and sighting device in such plane.

2. A binnacle, a compass therein, a central support fixedly mounted on the compass, an alidade or indicator rotatable on said support adjacent the compass-dial, an upright rotatable shaft centrally mounted on the binnacle and having a sighting device at its upper end, and a connection between the lower end of the shaft and the alidade or indicator, to maintain it and the sighting device angularly movable in the same plane and permit relative tipping movement of the alidade and sighting device in such plane.

3. A binnacle, a compass therein, a support fixedly mounted on the compass, coaxial with the needle, an alidade or pointer rotatable on said support, adjacent the compass-dial, a sighting device rotatably mounted on the binnacle, and connecting means between said device and the alidade or pointer to maintain them in the same radial plane and permit relative tipping movement of the sighting device and alidade in such plane.

4. A binnacle, a compass therein, a support fixedly mounted on the compass at the center of the dial, an alidade or pointer rotatable on said support adjacent the dial, an upright shaft rotatably mounted on the binnacle, a sighting device mounted to tip on the upper end of the shaft in a plane intersecting the longitudinal axis of the latter, and a connection between the lower end of the shaft and the alidade or pointer, to maintain it and the sighting device in the same radial plane and permit relative tipping movement of the sighting device and alidade in such plane.

5. In an alidade for ships' compasses, a rotatable vertical shaft supported centrally in the binnacle-top, a sighting device pivotally mounted on the upper end of the shaft to tip in a plane intersecting the longitudinal axis of the shaft, an alidade or pointer, a bearing on which it is rotatably mounted adjacent the compass-dial, means to rigidly sustain said bearing on the compass at the center of the dial, and a connection between the lower end of the rotatable shaft and the alidade or pointer, to maintain the latter and the sighting device in the same radial plane and permit relative tipping movement of said sighting device and the alidade in such plane.

6. In an adjustable alidade for ships' compasses, a rotatable, longitudinally-extensible shaft supported centrally in and extended above and below the binnacle-top, a sighting device on the upper end of the shaft, an alidade or pointer rotatable adjacent the compass-dial, a central bearing for the alidade, fixedly mounted on the compass, and a connection between the lower end of the shaft and the alidade, to maintain the latter and the sighting device in the same radial plane and permit relative tipping movement of said device and the alidade in such plane.

7. A binnacle and its compass, an alidade-support fixedly mounted on the compass centrally of the dial, an alidade or pointer rotatably mounted on said support adjacent the dial, an upright shaft centrally and rotatably mounted in the binnacle-top and having a sighting device at its upper end, and a connection between the lower end of the shaft and the alidade to maintain it and the sighting device in the same radial plane and permit relative tipping movement of the alidade and sighting device in such plane, said connection including a member having a sight-opening affording a clear view of the alidade and the lubber-mark within the binnacle.

8. A binnacle, a rotatable, upright, longitudinally-extensible, sectional shaft mounted in the top thereof and having on its upper end a sighting device, a transverse fulcrum on which the latter may tip, the compass mounted within the binnacle, a central bearing above the compass-dial, an alidade or pointer rotatably mounted on the bearing and angularly movable adjacent the dial, a fixed cross-bar on the lower end of the shaft, parallel to the fulcrum of the sighting device, and a universal connection between the cross-bar and the alidade, to maintain the latter and the sighting device in the same radial plane and permit relative tipping movement of the alidade and sighting device in such plane.

9. A binnacle, a rotatable, upright shaft mounted in the top thereof and having on its upper end a sighting device, the compass mounted within the binnacle, a bearing above the center of the compass-dial and fixedly mounted on the compass, an alidade or pointer rotatably mounted on said bearing and angularly movable adjacent the dial, and a connection between the lower end of the shaft and the alidade to maintain it and the sighting device in the same radial plane while permitting them to tip relatively in such plane, said connection including a member universally jointed to the shaft and having its depending sides laterally separated to constitute a sight-opening.

10. A binnacle, a compass therein, a bearing fixedly mounted on the compass at the center of the dial, an alidade or pointer rotatable on said bearing adjacent the dial, an upright rotatable shaft mounted centrally in the binnacle-top and having a sighting device at its upper end, a longitudinally-adjustable rod mounted in the lower end of the shaft and depending into the binnacle, a yoke pivoted to said rod transversely to the sighting device, an extension member pivoted at its upper end to the yoke to swing transversely thereto, and a sliding, ball-and-socket connection between the lower end of said member and the alidade, to maintain the latter and the sighting device in the same radial plane and permit relative tipping movement in such plane.

11. A binnacle, a compass therein, an alidade or pointer rotatably mounted on the compass and movable adjacent the dial thereof, an upturned, longitudinally-bored post rigidly secured to the center of the alidade and having opposite longitudinal slots, a shaft rotatably mounted in the binnacle-top and having a sighting device mounted on its upper end, and a depending extension member fulcrumed on the lower end of the shaft to swing transversely to and also longitudinally of the sighting device and comprising two separated sides, and a foot or cross-bar connecting the lower ends of the sides, and a ball-like enlargement central on the cross-bar, to enter the bore of the post, the slots of the latter receiving the cross-bar and maintaining it transversely to the alidade, the described connection between the sighting device and alidade maintaining them angularly movable in unison in the same radial plane and permitting relative tipping movement thereof in such plane.

12. A binnacle, a compass therein, an alidade or pointer angularly movable adjacent the compass-dial, a bearing rigidly connected with the compass and on which the alidade is rotatably mounted, an upright shaft centrally and rotatably mounted, in the binnacle-top and having a sighting device at its upper end, and a universal-joint, tipping connection between the shaft and the alidade, to permit irregular movement of the shaft relative to the compass-dial and maintain the sighting device and alidade angularly movable in the same radial plane.

13. In an alidade or indicator for ships' compasses, the compass, its cover-plate, an upright bearing rigidly secured to the center thereof, an alidade pivotally mounted on said bearing to move angularly above the cover-plate, an upright, rotatable shaft, a sighting device mounted on the upper end thereof, a sleeve-bearing for said shaft, adapted to be secured to the binnacle-top, a rod adjustable longitudinally in the lower end of the shaft and extended into the binnacle, and a universal, longitudinally-extensible connection between said rod and the alidade, maintaining it and the sighting device angularly movable in unison and permitting tipping movement of the sighting device relatively to the alidade.

14. A binnacle, a compass therein, an alidade or pointer angularly movable adjacent the compass-dial, a bearing rigidly connected with the compass and on which the alidade is rotatably mounted, an upright shaft centrally and rotatably mounted, in the binnacle-top and having a sighting device at its upper end, a yoke pivotally connected with the lower end of the shaft within the binnacle, to swing fore and aft of the sighting device and having transverse, parallel hubs at its ends, an extension member comprising sides pivoted at their upper ends to the ends of the hubs, to swing transversely of the yoke, a cross-bar or foot having transverse, parallel arms at its ends, pivotal connections between the ends of the arms and the lower ends of the sides, whereby the latter are maintained in parallelism, the cross-bar being maintained parallel to the yoke, and a ball-and-socket, sliding connection between the cross-bar at its center and the alidade, substantially as and for the purpose described.

In testimony whereof I have signed my name to this specification in the presence of two subscribing witnesses.

WILLIAM S. BURGESS.

Witnesses:
GEO. W. GREGORY,
MARGARET A. DUNN.